United States Patent [19]

Teshima

[11] Patent Number: 4,638,379
[45] Date of Patent: Jan. 20, 1987

[54] TRACKING CONTROL SYSTEM FOR A VIDEO TAPE RECORDER

[75] Inventor: Tsunehiko Teshima, Mito, Japan

[73] Assignee: Hitachi, Ltd., Tokyo, Japan

[21] Appl. No.: 759,962

[22] Filed: Jul. 29, 1985

[30] Foreign Application Priority Data

Jul. 27, 1984 [JP] Japan .................................. 59-155297

[51] Int. Cl.⁴ .................. H04N 5/78; H04N 5/76; G11B 5/45
[52] U.S. Cl. ................................ 360/19.1; 360/77; 358/343
[58] Field of Search ............ 360/19.1, 75, 77, 78; 358/343

[56] References Cited

U.S. PATENT DOCUMENTS

| | | | |
|---|---|---|---|
| 4,148,083 | 4/1979 | Watanabe | 360/77 |
| 4,433,350 | 2/1984 | Tsuruta | 360/77 X |
| 4,509,083 | 4/1985 | Nakano | 360/77 |
| 4,539,603 | 9/1985 | Takeuchi et al. | 360/77 X |
| 4,558,378 | 12/1985 | Shibata et al. | 360/19.1 |
| 4,559,567 | 12/1985 | Maruichi et al. | 360/19.1 X |
| 4,573,089 | 2/1986 | Maeda et al. | 360/77 |
| 4,587,580 | 5/1986 | Takayama et al. | 360/77 |

Primary Examiner—Aristotelis M. Psitos
Attorney, Agent, or Firm—Antonelli, Terry & Wands

[57] ABSTRACT

In a system for controlling a tracking position of a rotary head for a VTR which has a rotary head including an audio and video heads, the existence of an audio signal reproduced by the audio head is detected and the tracking control is carried out on the basis of either the level of said audio FM signal when it exists or the level of a video FM signal reproduced by the video head when the audio FM signal does not exist.

5 Claims, 1 Drawing Figure

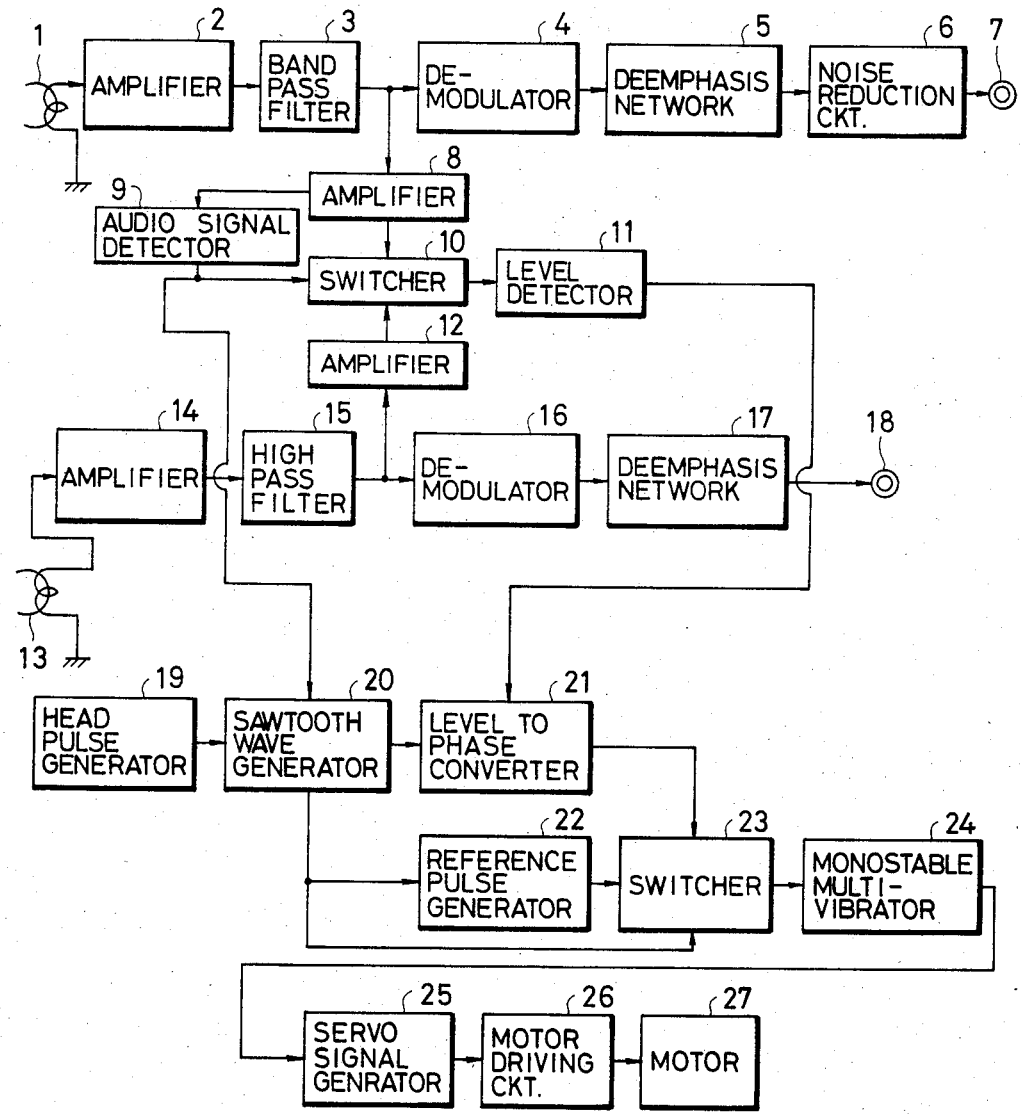

TRACKING CONTROL SYSTEM FOR A VIDEO TAPE RECORDER

BACKGROUND OF THE INVENTION

The present invention relates to a system for the tracking control appropriate to a video tape recorder (hereinafter abbreviated to "VTR"). The system according to the present invention is especially appropriate for the so-called VHS Hi-Fi VTR which enables to record and reproduce audio signals with high quality by the audio head provided in addition to the video head in the type of the rotary head.

In such Hi-Fi VTR, a rotary head is composed of a rotatable drum, at least one audio head for recording and reproducing a carrier signal subjected to frequency modulation with a audio signal (hereinafter abbreviated to "an audio FM signal"), and at least one video head for recording and reproducing a carrier signal subjected to frequency modulation with a video signal (hereinafter abbreviated to "a video FM signal"), both heads being mounted on a circumference of the rotatable drum with a predetermined distance from each other.

First, by the audio head in the rotary head, the audio FM signal is recorded on the recording track for the video FM signal, and subsequently, by the video head in the rotary head, the video FM signal is superposedly recorded on the same track as the track on which the audio FM signal has been recorded. Namely, the audio FM signal is first recorded, and the video FM signal is subsequently superposed thereon. The audio FM signal is recorded down to the depths of the magnetic layer of the magnetic tape, whereupon the video FM signal is recorded on the surface of the magnetic layer of the magnetic tape.

Up to this time, concerning the system for the tracking control of the rotary head in a Hi-Fi VTR of the VHS type, there is a system in which the tracking error is detected based on the level of the video FM signal reproduced by the video head included in the rotary head, however in such a system the audio head in the rotary head is not necessarily controlled to the optimal tracking state. Namely, the head width of the video head is generally wider than the width of the video track on which video signals are recorded by the azimuth recording method, hence a certain admissible range can be set for the tracking control of the video head. However, because the head width of the audio head usually equals to the width of the track for recording signals, admissible range can not be set differing from the case of the above mentioned video head. As the result, in the above mentioned system in which the tracking error is detected on the basis of the video FM signal reproduced by the video head, the audio head may be out of the optimal tracking state even if the video head is in the admissible range for the tracking control, and as the result, the system has a defect that the S/N ratio of the audio signals reproduced by the audio head may be worse.

Hence, in order to eliminate such a defect, it can be considered to detect the tracking error of the rotary head on the basis of the audio FM signal reproduced by the audio head instead of the video FM signal reproduced by the video head, but in this case it becomes to a problem that the audio FM signals do not always exist differing from the video FM signals and the normal tracking control operation may be impossible while the audio FM signals do not exist (no sound periods).

SUMMARY OF THE INVENTION

The object of the present invention is to eliminate the defect of the above mentioned conventional technique and to provide the system for the tracking control in which the tracking control is carried out by detecting the tracking error based on the level of the audio FM signals reproduced by the audio head and furthermore the deterioration in the signal to noise ratio of the reproduced audio signals due to the slipping out of the tracking of the audio head is prevented and also the tracking control operation is not failed even in the period of no existence of the above mentioned audio FM signals.

The above object is accomplished by the present invention which provides a tracking control system comprising; a detector for detecting the existence of the audio FM signal reproduced by the audio head; a level detector for detecting a level of a signal applied thereto and producing an output an amplitude of which is proportional to the level of the signal applied thereto; a switching circuit for selectively supplying the level detector with the audio FM signal reproduced by the audio head when the audio FM signal exists and with the video FM signal reproduced by the video head when the audio FM signal does not exist, in response to an output of the detector for detecting the existence of the audio FM signal; and means for controlling a tracking position of the rotary head on the basis of the output of the level detector so as to make the output of the level detector maximum.

BRIEF DESCRIPTION OF THE DRAWING

The accompanying drawing is a block diagram showing an embodiment of the tracking control system for a VTR according to the present invention.

DETAILED DESCRIPTION OF PREFERRED EMBODIMENTS

In the following, an embodiment of the present invention will be explained referring to the drawing.

The drawing is a block diagram showing an embodiment of the present invention. Reference numeral 1 denotes an audio head and 13 a video head and these are arranged neighboring in a proper distance along the circumference of the same drum (not illustrated in the FIGURE) and construct the rotary head for a Hi-Fi VTR of the VHS type. In the FIGURE for the convenience of explanation, each head is represented as consisting of only one head respectively, but each of these heads generally consists of a pair of two heads arranged separately from each other in 180°, respectively.

Numeral 2 denotes an amplifier for amplifying the audio FM signals reproduced by the audio head 1, numeral 3 a band pass filter, 4 a demodulator, 5 a deemphasis network, 6 a noise reduction circuit for expanding or restoring the dynamic range of the audio signals compressed at the time of recording and these blocks 2–6 are known as the audio signal reproducing block. The reproduced audio signals are taken out from the output terminal 7.

Numeral 14 denotes an amplifier for amplifying the video FM signals reproduced by the video head 13, numeral 15 a high pass filter, 16 a demodulator and 17 a deemphasis network and these blocks 14–17 are known as the video signal reproducing block. The reproduced video signals are taken out from the output terminal 18.

Numerals 8 and 12 designate amplifiers which amplify the audio FM signals branched from the band pass filter 3 and the video FM signals branched from the high pass filter 15, respectively. Numeral 10 designates a selective switching circuit, and 11 a level detector. The selective switching circuit 10 switches its output to the audio FM signals or to the video FM signals taken from the amplifiers 8 and 12 selectively and give these signals to the level detector 11. The level detector 11 carries out the envelope detection of the supplied FM signals and detects the level.

Numeral 9 designates a detector of the audio FM signals to which a part of the output of the amplifier 8 is supplied, and it detects the existence of the audio FM signals and controls the selective switching circuit 10 according to the detected output. In the case that the audio FM signals reproduced by the audio head 1 exist, the detector 9 detects its existence and controls to switch the selective switching circuit 10 so as to give the audio FM signals of the output of the amplifier 8 to the level detector 11, hence in this case it becomes that the level detector 11 detects the level of the audio FM signals from the audio head 1. Since the reproduced output level reproduced by a magnetic head from the recorded signal which has been recorded with a constant amplitude is generally proportional to the tracking error of the magnetic head, the level of the above mentioned audio FM signals detected by the level deteter 11 represents the tracking error of the audio head 1, hence if the tracking control is carried out by detecting the tracking error of the rotary head on the basis of this level, the state of the tracking control can be always optimal for the audio head 1. In this case, the video head 13 also follows after the audio head 1 and scans rotationaly on the magnetic tape in the relation of a certain constant phase, so it follows that the state of the tracking control of the video head 13 within the above mentioned admissible range can be obtained.

On the other hand, when the audio FM signals from the audio head 1 do not exist, due to no existence of the output of the audio FM signal detector 9, the selective switching circuit 10 is switched and the video FM signals from the amplifier 12 are supplied to the level detector 11 instead of the above mentioned audio FM signals. Then, on the basis of the level of the video FM signals, the detection of the tracking error of the rotary head and the tracking control are carried out. Accordingly, by this configuration it is possible to perform the tracking control even in the period of no existence of the audio FM signals (no sound period). Indeed, in this case, the performance of the tracking control of the rotary head can not be guaranteed to be the optimal tracking state similarly to the above mentioned conventional technique, however it is good enough because the audio signal does not exist.

Now, in the following, the concrete configuration for detecting the tracking error of the rotary head on the basis of the level of the audio FM signal or the video FM signal detected by the detector 11 and performing the tracking control will be explained. In the embodiment illustrated in the FIGURE, numeral 19 designates a head pulse generator circuit for generating the head pulse synchronized with the scanning period of the rotary head, 20 a sawtooth wave generator, 21 a level to phase converter, 22 a reference pulse generator circuit, 23 a switching circuit and 24 a monostable multivibrator. Means for detecting the tracking error of the rotary head is constructed by these circuits 19–24. Namely, the head pulse generator circuit 19 usually produces the head pulse sychronized with the scanning period of the rotary head during the VTR is in the PLAYBACK state and, on the basis of the said head pulse, the sawtooth wave generator 20 generates the sawtooth wave an amplitude of which increases in the positive direction in a phase synchronized with the phase of the rotational scan of the audio head 1, when the detected outputs of the audio FM signal detector 9 exist (when the audio FM signals exist).

The level to phase converter 21 compares the level of the output of the sawtooth wave generator 20 with the output of the level detector 11 (the level of the audio FM signal) and generates a pulse when both levels coincide with each other. Namely, this output pulse is a converted pulse whose phase is converted from the level of the audio FM signal and the phase delay becomes maximum when the level of the audio FM signal is maximum ( when the audio head is in the optimal tracking state).

On the other hand, the reference pulse generator circuit 22 generates a pulse which rises up at the beginning of the sawtooth wave generated by the sawtooth wave generator 20 and falls down after a certain constant period. The timing of falling down of the reference pulse is determined a priori so as to nearly coincide with the phase of the above mentioned converted pulse generated when the audio head is in the optimal tracking state (the maximum delayed phase).

The switching circut 23 is controlled to switch its output by the above mentioned reference pulse so as to supply the monostable multivilator 24 with the output of the level to phase converter 21 during the rising period (the high level period) of the reference pulse and with the output of the sawtooth wave generator 20 during the other period, respectively. Accordingly the trigger of the monostable multivibrator 24 is pulled first by the converted pulse obtained from the level to phase converter 21 and then pulled by a rising edge of the sawtooth wave derived from the sawtooth wave generator 20 (an edge of a part of the sawtooth wave) when the audio head 1 is not in the optimal traking state and hence output pulses having the phase difference according to the triggers are obtained from the monostable multivibrator 24. This phase difference is determined by the phase of the converted pulse given by the level to phase converter 21 and because the phase of the said converted pulse corresponds to the level of the audio FM signal detected by the level detector 11, that is the tracking error of the audio head 1, after all the phase difference of the output pulses of the above mentioned monostable multivibrator 24 represents the tracking error of the audio head 1.

In the case that the audio head 1 is in the optimal tracking state, because the generating phase of the converted pulse coincides nearly with the falling time instant of the reference pulse, the phase difference of the output pulses of the monostable multivibrator 24 becomes zero (the output becomes one pulse).

So far, the performance of the detecting means of the tracking error in the case of existing the audio FM signal has been explained, but such a performance of the detecting means of the tracking error is also carried out similarly when the audio FM signal does not exist and the level of the video FM signal is detected by the level detector 11. However, it follows that the tracking error of the video head 13 is detected instead of the tracking error of the audio head 1 and the optimal tracking position differs from that of the audio head 1 in a constant amount because, as the above mentioned, the video head 13 is arranged separately in a certain distance from the audio head 1 along the circumference of the rotating drum. Accordingly, in order to detect the tracking error of the audio head 13 correctly, the phase of the output sawtooth wave derived from the sawtooth wave generator 20 for the reference must be shifted to the amount which corresponds to the difference of the above mentioned optimal tracking position. Such a phase shift is accomplished by the output of the audio FM signal detector 9 in the embodiment illustrated in the FIGURE. Namely, when the audio FM signal does not exist (when the tracking control is carried out by the video signal) the output of the audio signal detector 9 shifts the generating phase of the sawtooth wave in the sawtooth wave generator 20 to be adapted for the detection of the tracking error of the video head 13.

Now, the tracking error signal of the audio head 1 or the video head 13 detected in such a manner, that is, the output pulses of the monostable multvibrator 24 are given to the servo signal generator circuit 25 and the servo signal generator circuit 25 generates the tracking servo signal based on the phase difference of the output pulses of the above mentioned monostable multivibrator 24. This servo signal controls the phase of the rotation of the motor 27 for driving the rotary head or the capstan via the motor driving circuit 26, and by doing this the tracking control of the rotary head is carried out.

So far, the embodiment of this invention has been explained, but as a matter of course, the detecting means of the tracking error proposed in the present envention is not limited to the above embodiment and can be applied to all cases that the tracking error can be detected on the basis of the audio or video signal.

What is claimed is:

1. A tracking control system for a VTR having a rotary head which is composed of a rotatable drum, at least one audio head for recording and reproducing an audio FM signal, and at least one video head for recording and reproducing a video FM signal, both heads being mounted on a circumference of the rotatable drum with a predetermined distance from each other, said system comprising;
    a detector for detecting the existence of the audio FM signal reproduced by the audio head;
    a level detector for detecting a level of a signal applied thereto and producing an output an amplitude of which is proportional to the level of the signal applied thereto;
    a switching circuit for selectively supplying the level detector with the audio FM signal reproduced by the audio head when the audio FM signal exists and with the video FM signal reproduced by the video head when the audio FM signal does not exist, in response to an output of the detector for detecting the existence of the audio FM signal; and
    means for controlling a tracking position of the rotary head on the basis of the output of the level detector so as to make the output of the level detector maximum.

2. A tracking control system according to claim 1, wherein said means include a level to phase converter for generating pulses each generating phase of which corresponds to the amplitude of the output produced from said level detector, and said means control the tracking position of the rotary head on the basis of the pulses generated by the level to phase converter so as to make the delay in each generating phase of the pulses maximum.

3. A tracking control system according to claim 2, wherein said system further comprising means for adjusting the generating phases of said pulses in response to the output of said detector for detecting the existence of the audio FM signal when the audio FM signal does not exist, so as to compensate a phase difference corresponding to the distance between the audio and video heads mounted on the circumference of said rotatable drum.

4. A tracking control system for a VTR having a rotary head which is composed of a rotatable drum, at least one audio head for recording and reproducing an audio FM signal, and at least one video head for recording and reproducing a video FM signal, both heads being mounted on a circumference of the rotatable drum with a predetermined distance from each other, said system comprising;
    a detector for detecting the existence of the audio FM signal reproduced by the audio head;
    a level detector for detecting a level of a signal applied thereto and producing an output an amplitude of which is proportional to the level of the signal applied thereto;
    a first switching circuit for selectively supplying the level detector with the audio FM signal reproduced by the audio head when the audio FM signal exists and with the video FM signal reproduced by the video head when the audio FM signal does not exist, in response to an output of the detector for detecting the existence of the audio FM signal;
    a sawtooth wave generator for generating a sawtooh wave in synchronism with a scanning period of the rotary head;
    a level to phase converter for comparing the level of the sawtooth wave obtained from the sawtooth wave generator with the output level of the level detector and generating a pulse when both levels coincide with each other;
    a reference pulse generator for generating reference pulses each of which rises up at the beginning of the sawtooth wave generated by the sawtooth wave generator and falls down after a predetermined constant period;
    a second switching circuit for selecting the pulse applied thereto from the level to phase converter and the sawtooth wave applied thereto from the sawtooth wave generator and deliverring as output thereof the pulse of the level to phase converter during the high level period of the reference pulse and the sawtooth wave of the sawtooth wave generator during the remaining period;
    a monostable multivibrator for producing pulses triggered by the output of the second switching circuit;
    a servo signal generator for generating servo signals which controls rotations of a motor for rotating the rotatable drum or a capstan for causing a magnetic tape to travel, in response to the pulses obtained from the monostable multivibrator.

5. A tracking control system according to claim 4, wherein said system further comprising means for shifting the phase of the sawtooth wave generated by said sawtooth wave generator in response to the output of said detector for detecting the existence of the audio FM signal when the audio FM signal does not exist, so as to compensate a phase difference corresponding to the distance between the audio and video heads mounted on the circumference of said rotatable drum.

* * * * *